United States Patent [19]

Willett

[11] Patent Number: 5,446,467
[45] Date of Patent: Aug. 29, 1995

[54] TECH-TRACK

[75] Inventor: Eugene M. Willett, 11870 Ardel Dr., Lennon, Mich. 48449

[73] Assignee: Eugene M. Willett, Lennon, Mich.

[21] Appl. No.: 5,078

[22] Filed: Jan. 15, 1993

[51] Int. Cl.[6] .......................... G01S 1/08; F42B 6/04
[52] U.S. Cl. ..................................... 342/386; 273/416
[58] Field of Search ............... 342/385, 386; 273/416, 273/419, 420, 421, 423

[56] References Cited

U.S. PATENT DOCUMENTS

| Re. 33,470 | 12/1990 | Boy et al. | 342/386 |
|---|---|---|---|
| 2,989,310 | 6/1961 | Lamond | 273/416 |
| 3,600,835 | 8/1971 | Hendricks | 273/419 |
| 3,790,948 | 2/1974 | Ratkovich | 342/386 |
| 4,675,683 | 6/1987 | Robinson et al. | 342/386 |
| 4,940,245 | 7/1990 | Bittle, Jr. | 342/386 |
| 4,976,442 | 12/1990 | Treadway | 273/416 |
| 5,094,463 | 3/1992 | Dryden | 342/386 |
| 5,167,417 | 12/1992 | Stacey et al. | 273/416 |
| 5,188,373 | 2/1993 | Ferguson et al. | 273/421 |

Primary Examiner—Gregory C. Issing

[57] ABSTRACT

This device is easily detachable. When the arrow makes impact, the dart with the transmitter remains in the target. The impact activates the transmitter which puts out a signal that can be picked up by the receiver.

Because the device is small and ver light and has a counter-balance, it won't interfere with the accuracy and the flight of the arrow. This allows the archer to find the game faster and easier.

1 Claim, 2 Drawing Sheets

TECH-TRACK

BACKGROUND OF INVENTION

I invented this device to help archers find their wounded game, with less weight and interference of their shooting accuracy and little expense.

SUMMARY OF INVENTION

Figure 1:
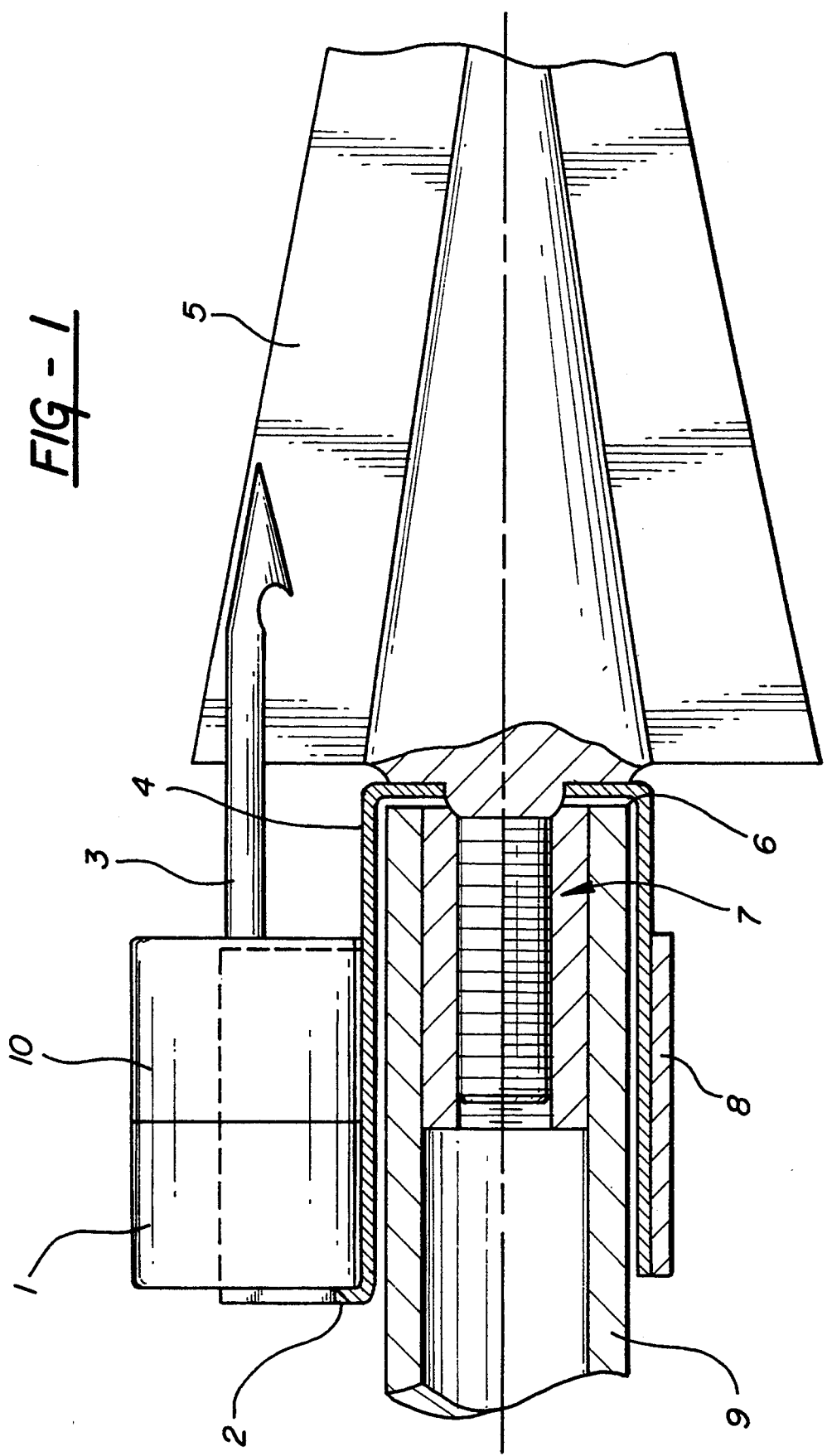
FIG. 1 shows the arrow with the electronic device (1 and 10) mounted in a bracket (4) that is between the head (5) of the arrow and shaft (9) with a weight on the other side for balance to ensure accuracy of flight of arrow to hit your target.
Figure 2:
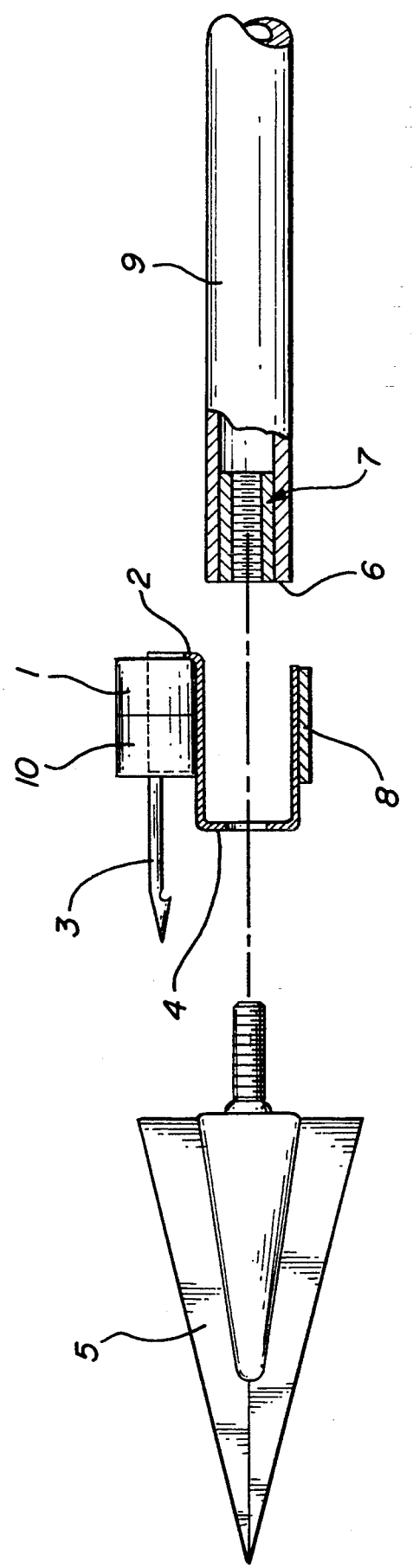
FIG. 2 explains how to mount the tracking device to the arrow. Unscrew head (5) from shaft (9) and the bracket (4) which has a circular hole in the front of it slips over the male part of arrow head (5). After you put bracket (4) over the male part of the head (5) screw head (5) onto shaft (9).

The invention has a electronic sender device (1) and battery (10) mounted in a bracket (4) on back of arrow head (5). This bracket is made of a spring steel, designed to release an electronic sender device when it strikes the target. The device is designed with a dart (3) to secure the sender (1) to the game which it penetrates. When the arrow hits, the sender unit (1) with dart (3) easily snaps out of the bracket (4). The battery and transmitter makes contact at impact activating a signal. You find your game even if the arrow has passed through it, because the sender unit stays in the game. You just disconnect the contact between the battery and transmitter and use it again. The sender and battery comes apart like a capsule to change the battery if needed.

A weight is positioned on the bracket in an opposed relationship to the sender device so as to counter-balance the weight of the sender device and thereby minimize the loss of accuracy due to an unbalanced arrow.

The bracket holding device is easily put on an arrow. Unscrew the head of the arrow and slip the bracket between the head and cap end of arrow and screw the head back on. If you have a bent arrow you can easily put tracking device on another arrow after checking the battery.

I claim:

1. A tracking device for tracking a wounded animal comprising:
   bracket means attached to an arrow;
   electronic sender device detachably coupled to said bracket means for transmitting a signal;
   counter-balance means attached to said bracket means in opposed relation to the electronic sender device; and,
   a receiver for picking up the transmitted signal and locating the electronic sender device, wherein the electronic sender device is connected to a barb to penetrate an animal.

* * * * *